(12) United States Patent
Gilliam (10) Patent No.: US 6,349,482 B1
(45) Date of Patent: Feb. 26, 2002

(54) THREE POSITION LOCKING MECHANISM FOR A TAPE MEASURE

(75) Inventor: Edgar Thomas Gilliam, Franklinton, NC (US)

(73) Assignee: Cooper Brands, Inc., Houston, TX (US)

(*) Notice: Subject to any disclaimer, the term of this patent is extended or adjusted under 35 U.S.C. 154(b) by 0 days.

(21) Appl. No.: 09/523,807

(22) Filed: Mar. 13, 2000

(51) Int. Cl.[7] ................................................. G01B 3/10
(52) U.S. Cl. ............................. 33/767; 33/755; 33/756; 33/757
(58) Field of Search .......................... 33/755, 756, 757, 33/759, 760, 761, 767, 769

(56) References Cited

U.S. PATENT DOCUMENTS

| | | |
|---|---|---|
| 3,675,334 A | 7/1972 | Quenot |
| 3,693,596 A | 9/1972 | Croce et al. |
| 4,205,448 A * | 6/1980 | Asai ............................ 33/767 |
| 4,998,356 A * | 3/1991 | Chapin ........................ 33/767 |
| 5,007,178 A | 4/1991 | Dewire et al. |
| 5,119,521 A | 6/1992 | Clontz |
| 5,377,626 A | 1/1995 | Kilsby et al. |
| 5,395,069 A * | 3/1995 | Chen ........................... 33/767 |
| 5,400,521 A | 3/1995 | Waldherr |
| 5,448,837 A * | 9/1995 | Han-Teng ..................... 33/761 |
| 5,632,453 A | 5/1997 | Hioki et al. |
| 5,657,551 A | 8/1997 | Lin |
| 5,806,202 A * | 9/1998 | Blackman et al. ............ 33/767 |
| 5,829,154 A | 11/1998 | Lin |
| 6,026,585 A * | 2/2000 | Li ............................... 33/767 |
| 6,256,901 B1 * | 7/2001 | Lin ............................. 33/767 |

* cited by examiner

*Primary Examiner*—Diego Gutierrez
*Assistant Examiner*—Yaritza Guadalupe
(74) *Attorney, Agent, or Firm*—Coats & Bennett, P.L.L.C.

(57) ABSTRACT

A retractable tape measure having a flexible tape biased in a coiled position, and a housing sized to contain the flexible tape. The housing includes an opening through which a first end of the flexible tape extends, and a slot for positioning a locking mechanism. A tape biasing member operatively connects to the flexible tape to bias it in a retracted position. The locking mechanism controls the extension and retraction of the flexible tape from the housing. The mechanism includes a locking lever having a grip arm extending through the slot and a lock arm for contacting the flexible tape. A pin extends through the locking lever making the locking lever pivotable between an open position in which the flexible tape can move freely through the opening, a maintain position in which the flexible tape only exits freely through the opening, and a locked position to prevent the tape from moving relative to the opening. A lock biasing member biases the locking lever towards the locked position.

21 Claims, 7 Drawing Sheets

THREE POSITION LOCKING MECHANISM FOR A TAPE MEASURE

FIELD OF THE INVENTION

The present invention is directed generally to tape measures and, more particularly, a locking mechanism for controlling the extraction and retraction of a tape from a tape measure housing.

BACKGROUND OF THE INVENTION

Modern tape measures generally include a coiled tape that is spring biased towards a retracted position. A protective housing surrounds the tape and spring and includes an aperture through which a distal end of the tape extends. The distal end of the tape is pulled away from the housing during use, and when released, the spring pulls the tape back into the housing so that the tape assumes the retracted position.

Various types of locking mechanisms are utilized for maintaining the tape in any given extended position. Locking mechanisms usually bind the tape within the housing and are actuated by the user through a slide or push button positioned on an outer edge of the housing. Thus, the tape may be extracted to the desired length and a locking mechanism engaged to hold the tape at that distance. The locking mechanism may then be disengaged and the tape is retracted into the housing.

Many previous tape measures only provide for the locking mechanism to be either completely engaged or completely disengaged. These devices do not provide for any intermediate levels of control which may be advantageous in various environments. The lack of any intermediate level limits the functionality and environments in which the tape measure may be used. To overcome this problem, some tape measures are equipped with two separate locking mechanisms. One locking mechanism provides for a positive lock function, essentially mimicking the engaged and disengaged functionality of the previous models. The second locking mechanism provides a drag function which opposes the retraction or extraction of the tape relative to the housing, but typically at a lower grip force level than the "full" locking condition. However, each of the two locking mechanisms require separate elements which must be positioned within the housing. See for example U.S. Pat. No. 5,007,178. A two activator arrangement thus complicates the tape measure design, usually leading to a higher overall cost. Additionally, the housing must be larger to contain the tape and at least two separate locking mechanisms which is undesirable as hand tools must easily fit within the user's hands, attach to work belts, or be stored within limited spaces such as a crowded tool box. Other tape measures may have either, but not both types of braking mechanisms.

Therefore, there is a need for a tape measure having a single locking mechanism operable in three modes: a free mode characterized by a disengaged or open position in which the tape is free to retract or extend from the housing; a lock mode characterized by a lock position in which the tape is prevented from moving relative to the housing; and a maintain mode characterized by a maintain position in which the tape is prevented from retracting, but is allowed to extend relatively freely.

SUMMARY OF THE INVENTION

The present invention is directed to a tape measure having a variety of locking positions for controlling the retraction and extraction of a tape. The variety of positions allows a user to more easily handle and manipulate the tape to his or her advantage, especially when they are doing multiple tasks.

The tape measure includes a flexible tape subject to a bias towards a retracted position and a housing substantially surrounding the tape when it is in the retracted position. A locking lever is connected to the housing and includes a tip for selectively engaging the tape. The locking lever is positionable between at least three positions corresponding to the three functional modes. A free mode positions the locking lever and tip away from the tape for relatively free retraction and extraction of the tape from the housing. A lock mode engages the tip against the tape requiring increased force to extract or retract the tape relative to the housing. A maintain mode engages the tip against the tape to require force to retract the tape into the housing, but require little additional force with respect to the free mode for extraction.

Preferably, the locking lever pivots about an axis to accommodate the three modes. The locking lever includes a lock arm that extends to the tape, and a grip arm that extends outside the housing allowing for the user to control the modes. A tip is connected to the end of the lock arm for contacting the tape. The tip is constructed of a pliable material. In one embodiment, the tip is positioned off-center from the centerline of the lock arm in the lock mode for increased holding.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms. It should be understood that the illustrations are for the purpose of describing a preferred embodiment of the invention and are not intended to limit the invention thereto.

Figure 1:
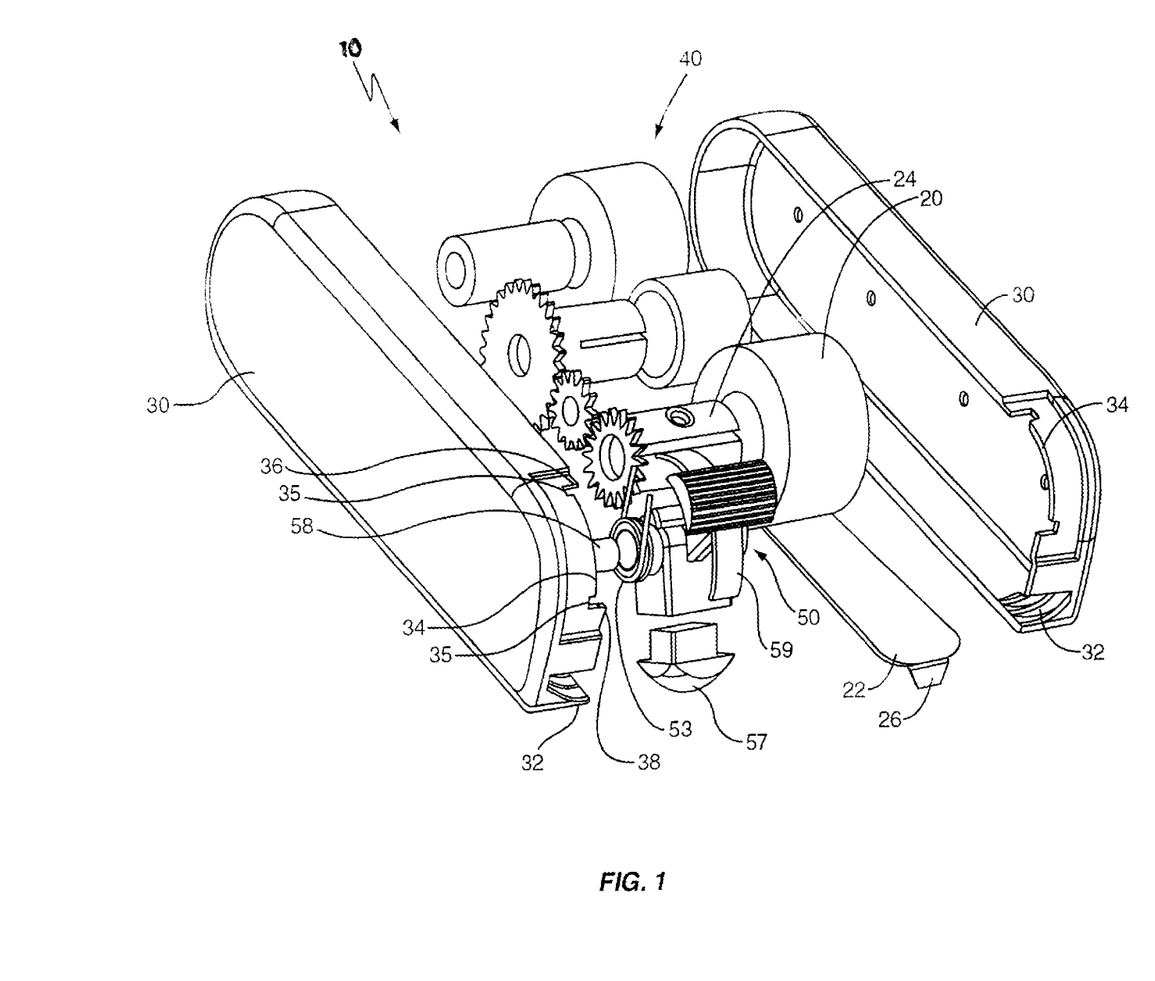
FIG. 1 is an exploded perspective view of a tape measure constructed in accordance with the present invention.

As illustrated in FIG. 1, a tape measure, generally designated 10, is shown constructed according to the present invention. The tape measure 10 includes a coilable measuring tape 20 contained within a housing 30. The tape 20 includes a proximal end positioned about a shaft 24 and a distal end 22 which extends through an opening 32 within the housing 30. The distal end 22 is preferably equipped with a lip 26 to prevent it from being retracted into the housing 30. A tape-biasing device 40 is operatively connected to the tape 20 to bias it towards a retracted orientation in which the lip 26 contacts the opening 32. A locking mechanism 50 is selectively positionable between open, maintained, and locked positions to control the extraction and retraction of the tape 20 to and from the housing 30.

The housing 30 extends around and protects the tape 20, tape-biasing device 40, and locking mechanism 50. Housing 30 includes the opening 32 through which the tape distal end 22 extends, and a slot 34 having a first end 36 and second end 38 through which a part of the locking mechanism 50 extends. The slot 34 may further include detents 35 for maintaining the position of the locking mechanism 50. Shafts and/or mounting components may be mounted on the housing inner edges for positioning the tape 20, locking mechanism 50, and tape biasing device 40. The housing 30 is preferably sized to fit within a user's hand, and also conveniently stored on a work belt or toolbox. Housing 30 is preferably manufactured in a two-piece construction as illustrated in FIG. 1, and made from a durable material such as a hardened plastic.

Figure 3:
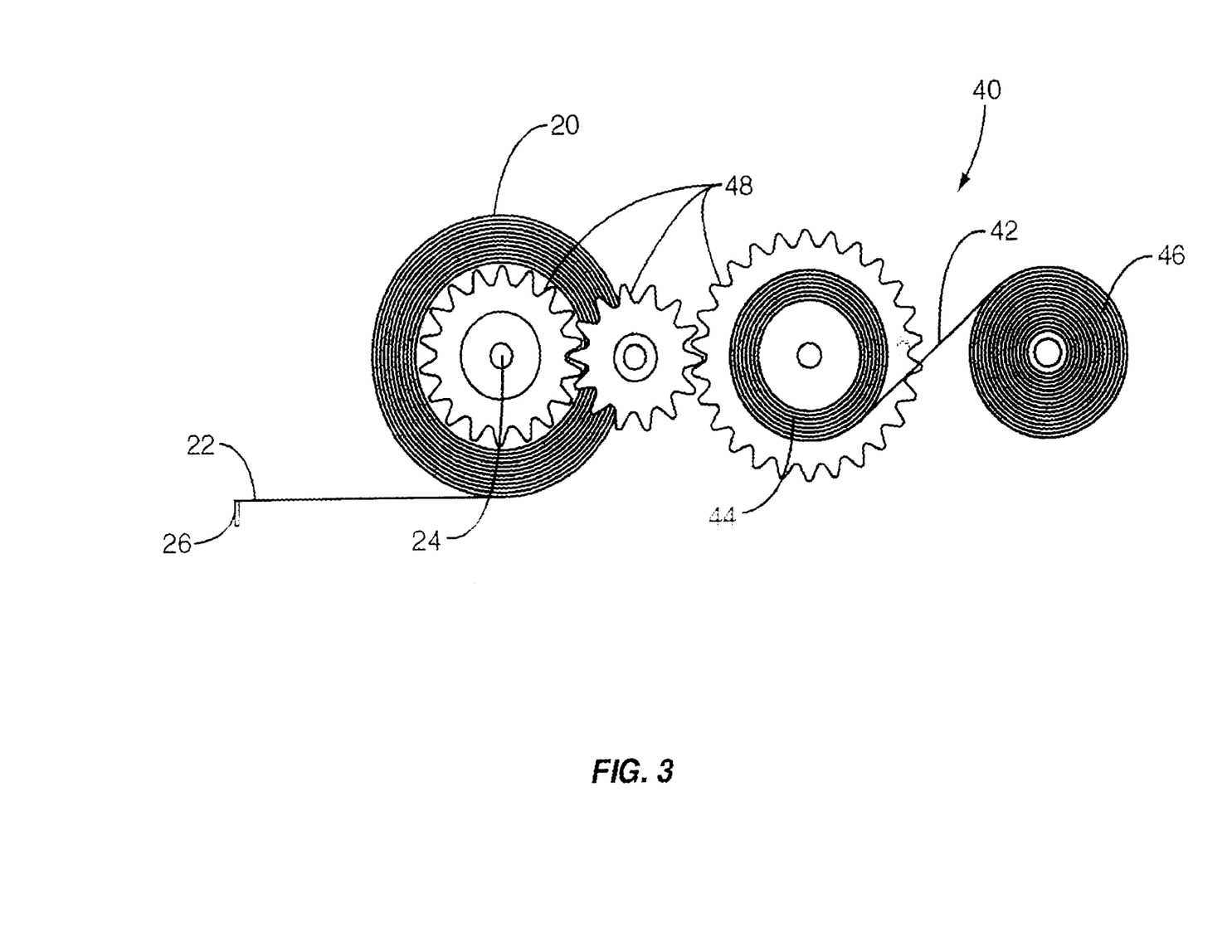
FIG. 3 is a side view illustrating the tape biasing device.

The tape biasing device 40 urges the tape 20 into the retracted position within the housing 30. In one embodiment best illustrated in FIG. 3, the device 40 includes a spring 42 positioned in two coils 44, 46. Gears 48 are attached between coil 44 and the tape shaft 24 for transferring the spring biasing force to the attached tape 20. When the tape distal end 22 is extracted from the housing 30, the tape shaft 24 rotates causing rotation of the gears 48 thereby tightening the spring 42 onto the coil 44. When the tape 20 is released, the spring 44 returns to coil 46 thereby rotating the gears 48 and causing retraction of the tape into the housing 30. This type of tape biasing device is disclosed in U.S. Pat. No. 5,119,521 herein incorporated by reference in its entirety. One skilled in the art will understand that other types of biasing devices are available for retracting the tape 20 into the housing 30, any of which may be used with the present invention.

Figure 2:
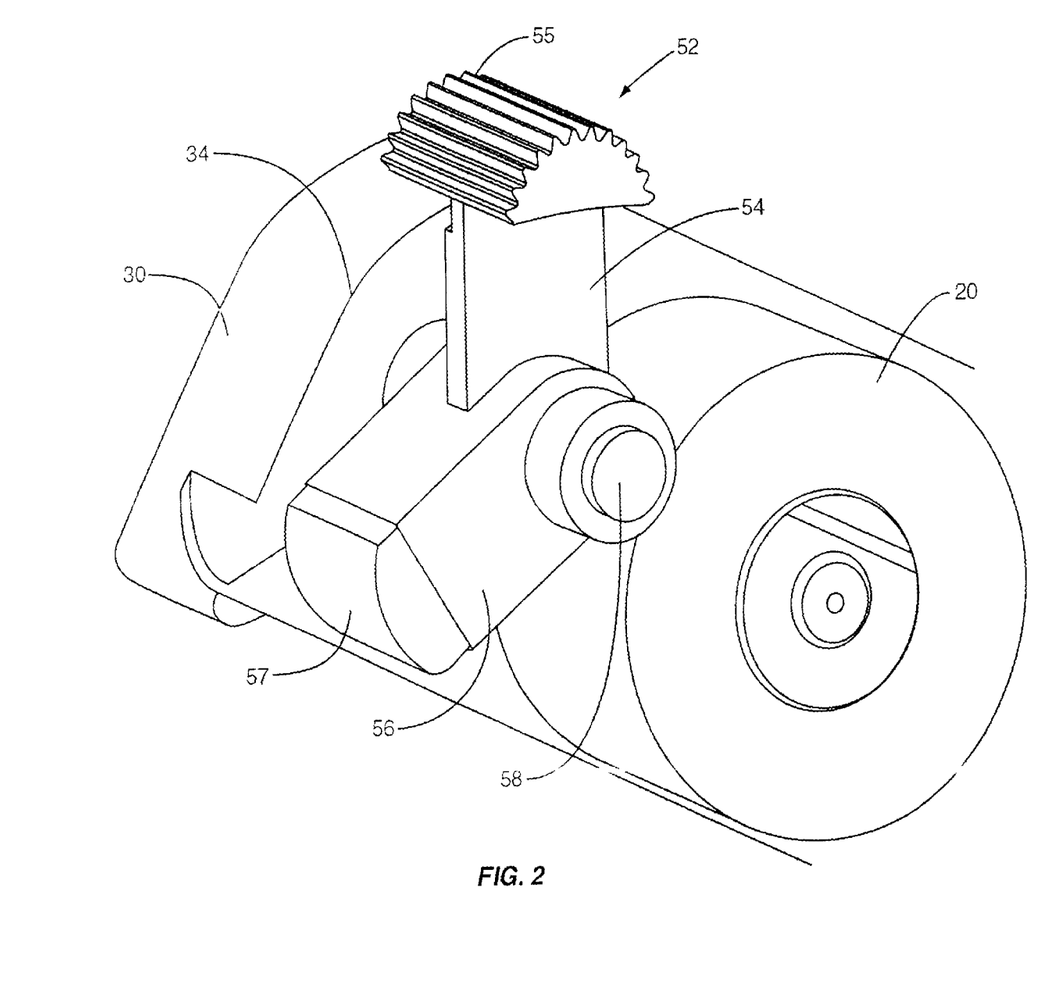
FIG. 2 is a partial perspective view illustrating the locking lever and tape.

The locking mechanism 50 includes a locking lever 52 and an optional lockbiasing member 53. Locking lever 52 is best illustrated in FIG. 2 and includes a substantially L-shaped member having a grip arm 54 and a lock arm 56. Grip arm 54 extends through the housing slot 34 and includes a gripping surface 55 positioned on the outside of the housing 30 for contact by the user. Preferably, the gripping surface 55 includes a contoured surface to prevent the user's hands or fingers from slipping. The lock arm 56 extends at an angle from the grip arm 54. The lock arm 56 and grip arm 54 should be angled relative to one another such as between about 80°–110°, and preferably about 90°. In one embodiment, the grip arm 54 and lock arm 56 are constructed in a unitary manner. A guide member 59 may extend from the grip arm 54 for maintaining the orientation of the locking lever 52 within the housing slot 34 and cover the slot 34 to prevent debris from entering the housing 30 via the slot 34.

Figure 5A:
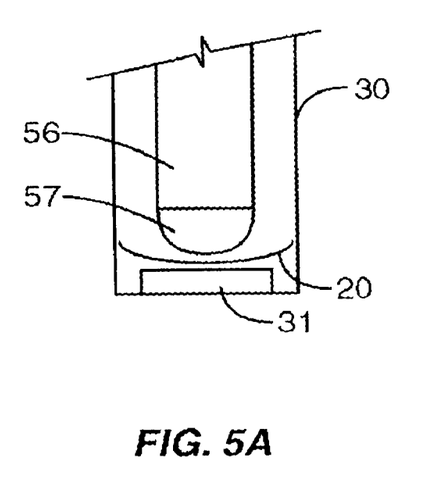
FIG. 5A is an end view illustrating the free mode wherein the tip is in the open position located above the tape.
Figure 5B:
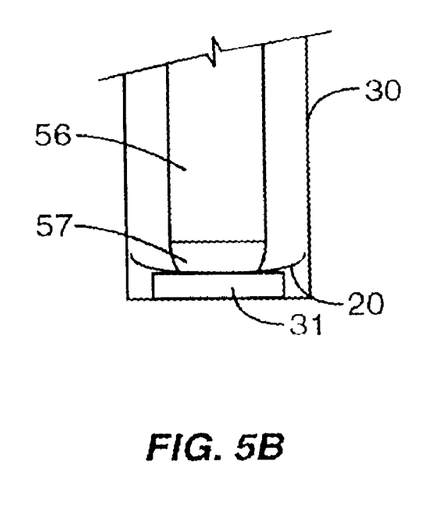
FIG. 5B is an end view illustrating the lock mode wherein the tip is rotated to the locked position against the tape.

The end of the locking arm 56 includes a tip 57 for contacting and controlling the retraction and extraction of the tape 20. The tip 57 is preferably constructed of a high friction, pliable material such as a soft rubber to prevent the tape 20 from unintentionally slipping through the locking mechanism 50. The tape 20 has a concave shape as it exits the housing 30 as illustrated in FIGS. 5A and 5B. Preferably, the radius of the tip 57 is less than the tape radius such that the tip 57 contacts a central area of the tape 20.

Figure 4A:
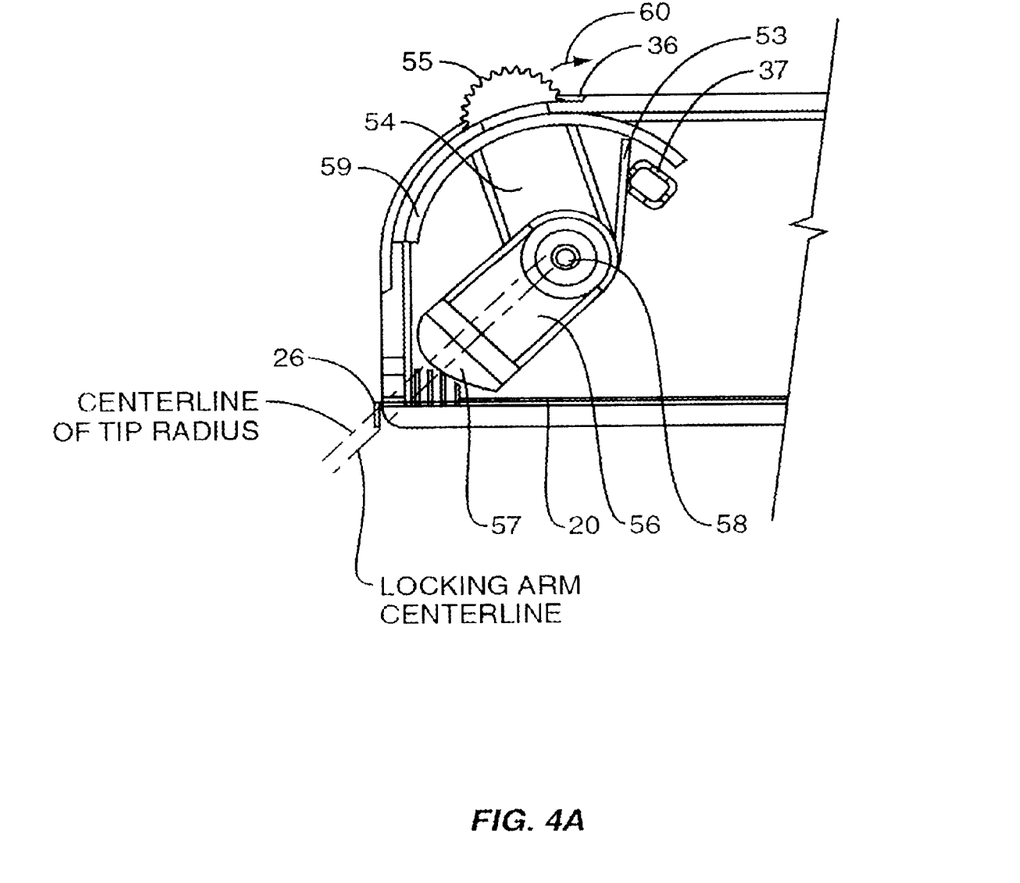
FIG. 4A is a partial side view illustrating the locking mechanism in an open orientation.

Tip 57 has a compound radius, the apex of which is offset from a middle line of the locking arm 56 as illustrated in FIG. 4A. This orientation provides the tip 57 with a cam-like action against the tape 20. When the locking arm 56 moves beyond the vertical centerline CL of rotation in the locked position, as will be described below, the surface of the tip 57 does not recede from the tape 20, as it would if the is tip 57 was centered on the locking arm 56. In one embodiment, the apex of the tip 57 is about 0.030 inches offset clockwise from a middle line of the locking arm 56 as illustrated in FIG. 4A.

The locking lever 52 is mounted within the housing 30 on an axle or pin 58 that extends from the inner edges of the housing 30. This positioning allows the locking lever 52 to rotate between open, maintain, and locked positions as will be explained below. In one embodiment, the pin 58 is aligned substantially parallel with the shaft 24.

The optional lock-biasing member 53 biases the locking lever 52 such that the tip 57 contacts the tape 20. In the embodiment illustrated in FIGS. 1, 4A, 4B, and 4C, the lock-biasing member 53 is a torsion spring having two ends and an inner coiled section. Preferably, mounts 37 extend from the grip arm 54 and the inner housing to contain the spring ends, and the coiled section is positioned around the pin 58.

Figure 4B:
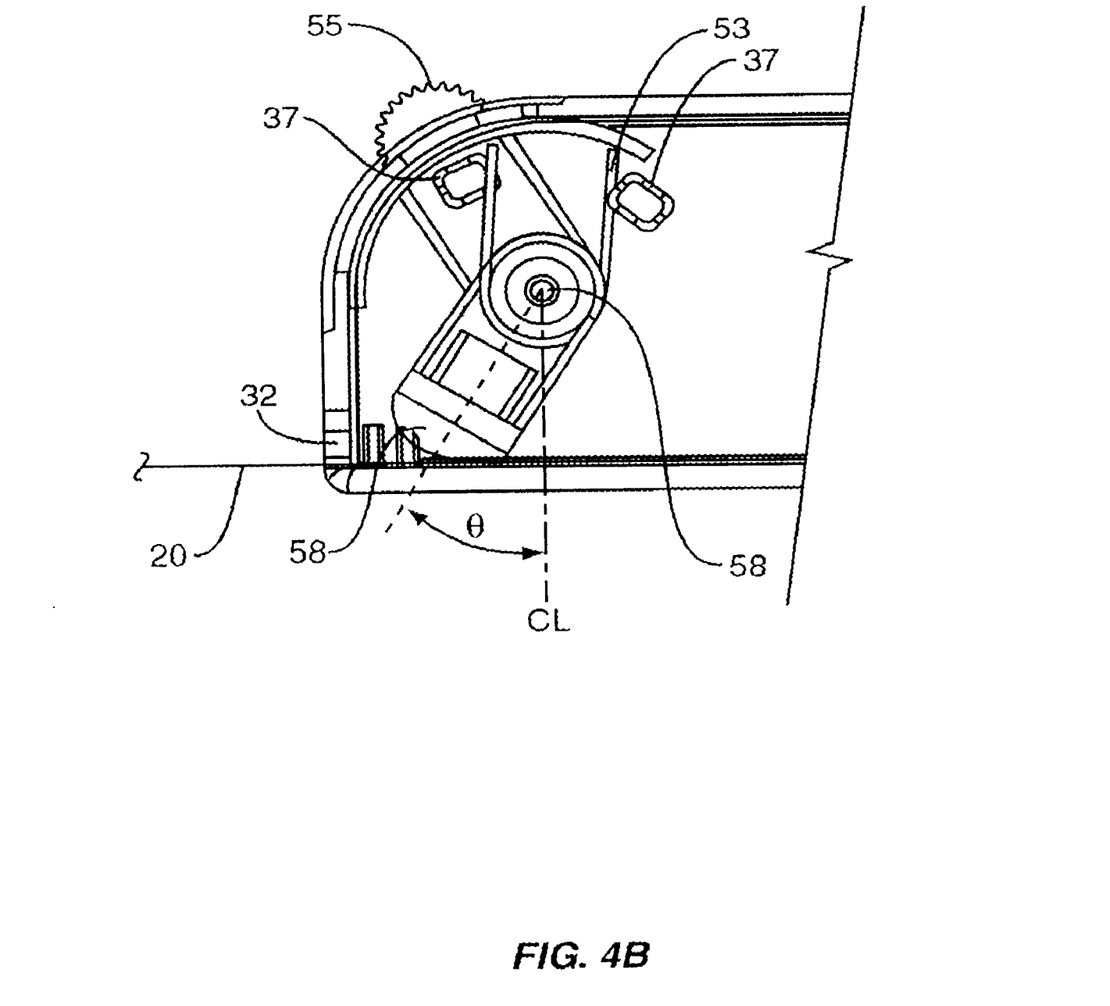
FIG. 4B is a partial side view illustrating a locking mechanism in a maintained orientation.
Figure 4C:
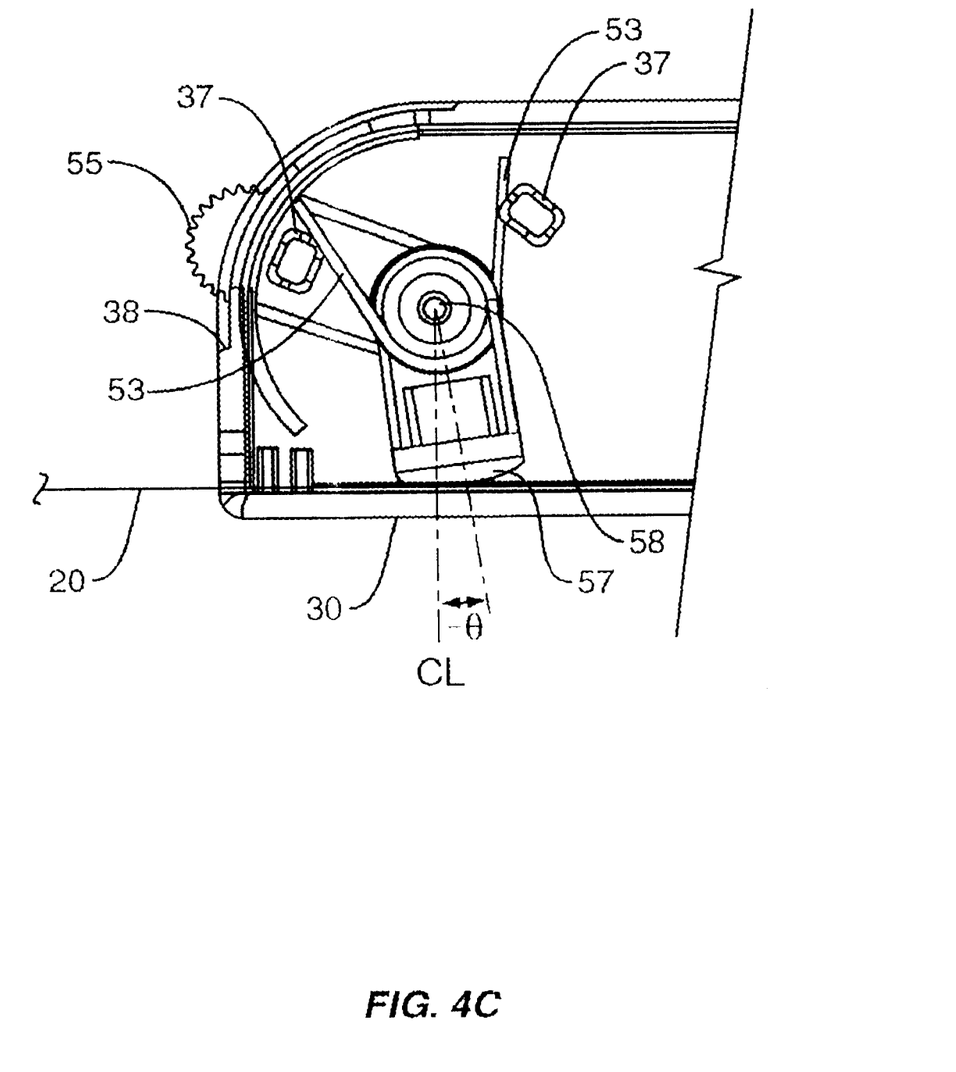
FIG. 4C is a partial side view illustrating the locking mechanism in a lock orientation.

The use of the tape measure 10 in operation is illustrated in FIGS. 4A, 4B, and 4C. The lock-biasing member 53 maintains the locking lever 52 in the maintain position as illustrated in FIG. 4B when no external forces are applied. A force to overcome the lock bias is applied by the user to the gripping surface 55 in the direction of arrow 60 in FIG. 4A to move the locking lever 52 to the open position with the tip 57 removed from and not in contact with the tape 20. The force applied by the tape-biasing device 40 pulls the tape 20 into a retracted orientation with the tape lip 26 contacting the housing 30 in proximity to the opening 32. The maximum extent of rotation of the locking lever 52 may be controlled by the grip arm 54 contacting the slot first end 36 or a boss (not illustrated) extending from the housing. In the open position, a force of about 1.0 lbs. is required to extract the tape 20 from the housing 30. This is necessary to overcome the retraction force applied by the tape biasing device 40.

The maintain position illustrated in FIG. 4B allows the tape 20 to be extracted (also referred to as extended) from the housing 30, but prevents unintentional retraction of the tape 20 into the housing. An angle θ is formed between a line extending through the center of the grip arm 54 and a centerline CL.

In the embodiments illustrated in FIGS. 4A–4C, the centerline CL is the line drawn between the locking mechanism pin 58 and the bottom of the case 30. The centerline CL forms an imaginary line at about a ninety degree angle to the case bottom and through the center of the locking member pin 58. In the maintain position, the grip arm 54 of the locking lever 52 is rotated (counter-clockwise in FIG. 4B) such that angle θ is roughly between about 5°–40°, and preferably about 30°. In some embodiments, the optional lock biasing device 53 applies a force to the locking lever 52 to hold the tape 20 between the tip 57 and housing 30. Alternatively, the locking lever 52 may be held in the maintain position by other means, such as by detents and the like. With the locking lever 52 in the maintain position, a force of about 1.4 lbs. is necessary to extract the tape from the housing 30, while the force necessary to push in, or retract the tape 20 into the housing 30 is about at least 7 lbs. This force is necessary to overcome the frictional contact between the tip 57 and the force applied to the tape 20 by the tape biasing device 40. Retraction of the tape 20 into the housing 30 will tend to rotate the lever arm 52 in a counterclockwise direction, thereby lessening θ and increasing the gripping force exerted by the lever arm 52 and the housing 30. Thus, in the maintain position, extension of the tape requires overcoming the retraction spring and some slight amount of drag from the frictional contact of the tip 57 while retraction requires overcoming an increasing amount of gripping force exerted by the lever arm 52 and the housing 30. Thus, in the maintain position, the tape 20 may be easily pulled out (extended), but will not be pulled back into the housing 30 (retracted) when released by the user. The maintain position is preferably the default position when no external forces are applied to the tape 20 or locking mechanism 50.

FIG. 4C illustrates the locking mechanism 50 in the locked position in which extraction and retraction of the tape 20 relative to the housing 30 is prevented. In this position, the locking lever 52 is further rotated counterclockwise by the user such that the tip 57 of the lock arm 56 clamps the tape 20 against the housing 30. In one embodiment illustrated in FIG. 4C, the lock arm 56 rotates beyond the centerline CL resulting in a negative θ. In this embodiment, the locking lever 52 is mounted within the housing 30 such that the tip 57 of the lock arm 56 experiences maximum deformation after the lock arm 56 has rotated beyond the centerline CL due to the offset of the apex of the tip 57 relative to the locking arm 56. The deformation may also be felt by the user as they contact the gripping surface 55 providing positive enforcement that the locking mechanism is in the locked position. In the locked position, the tip 57 of the lock arm 56 preferably remains at least partially deformed so as to substantially clamp the tape 20 between the tip 57 and the housing 30. In one embodiment, the angle θ in the lock position is between about 0°–(−20°), and preferably about −12°. The maximum extent of angle θ may also be controlled by the grip arm 54 contacting the slot second end 38, or a boss (not illustrated) may extend from the inner edge of the housing. In the locked position, about 15 lbs. of force is required to pull the tape 20 from the housing 30. The push-in or retraction force is about at least 7 lbs.

In the locked position in which the locking arm 56 is rotated beyond the centerline CL, an over-center lock occurs. The force between the case bottom and the tip 57 serves to maintain the locking mechanism 50 in the same position because the force is directed at continuing the counter-clockwise rotation of the locking mechanism 50. This prevents the locking mechanism 50 from inadvertently slipping out of the locked orientation.

FIGS. 5A and 5B illustrate the movement of the tip 57 relative to the tape. FIG. 5A illustrates the tip 57 in the open position located above the tape 20. As is customary in the industry, the tape 20 has a concave shape as it extends from the housing 30. The tip 57 preferably has a corresponding curved shape having a rounded edge that substantially conforms to the shape of the tape 20. In the locked position illustrated in FIG. 5B, the tip 57 is placed firmly against the tape 20. Preferably, the tip 57 contacts an inner portion of the tape such that the tape 20 maintains the concave shape while the tip deforms and holds the tape 20. The housing 30 may further include a contact surface 31 which contacts the tape 20 opposite the tip 57. In the maintain position, the tip 57 preferably rests against the tape 20, but with less pressure than in the locked position.

Certain modifications and improvements will occur to those skilled in the art upon a reading of the foregoing description. In one embodiment, the grip arm 54 and lock arm 56 are separately constructed and connected together at an angle to form the locking lever 52. It should be understood that all such modifications and improvements have been deleted herein for the sake of conciseness and readability, but are properly within the scope of the following claims.

What is claimed is:

1. A tape measure comprising:
    a) a flexible tape subject to a bias towards a retracted position;
    b) a housing substantially surrounding said tape in said retracted position;
    c) a locking lever connected to said housing and including a tip for selectively engaging said tape, said locking lever operative to change said tape measure between at least three modes, said modes including:
        i) a free mode wherein said tip is spaced from said tape;
        ii) a lock mode wherein said tip engages said tape so as to prevent said tape from being extended from said housing or retracted into said housing; and
        iii) a maintain mode wherein said tip engages said tape to prevent said tape from being retracted into said housing while allowing said tape to be extended from said housing.

2. The tape measure of claim 1 wherein said locking lever pivots about a first axis to change said tape measure between said at least three modes.

3. The tape measure of claim 2 wherein said tape forms a coil in said retracted position about a second axis and wherein said first axis is disposed substantially parallel to, but spaced from, said second axis.

4. The tape measure of claim 3 further including an axle disposed within said housing and along said first axis, wherein said locking lever further includes a lock arm and a grip arm and pivots about said axle, said grip arm extending outside said housing for actuation by a user.

5. The tape measure of claim 3 wherein said lock arm and said grip arm form a substantially unitary member.

6. The tape measure of claim 5 wherein said lock arm and grip arm are angled in a range of between about 80°–100°.

7. The tape measure of claim 1 wherein said tip is offset from said locking lever.

8. The tape measure of claim 7 wherein said tip is constructed of a deformable material.

9. The tape measure of claim 1 wherein said locking lever rotates about said axle relative to a centerline between about 0° to about (−15°) in said lock mode, about 0° to about 40° in said maintain mode, and greater than about 45° in said open mode.

10. The tape measure of claim 1 further including a lock biasing device for maintaining said locking lever in said maintain position when no external forces are applied.

11. A retractable tape measure comprising:
    a) a flexible tape biased in a coiled position;
    b) a housing sized to contain said flexible tape, said housing having an opening through which a first end of said flexible tape extends, and a slot;
    c) a tape biasing member operatively connected to said flexible tape; and
    d) a locking mechanism for controlling the extension and retraction of said flexible tape from said housing, said locking mechanism including a locking lever having a grip arm extending through said slot and a lock arm for contacting said flexible tape, said locking lever being pivotable between an open position in which said lock arm is positioned away from said flexible tape and said flexible tape may extend and retract through said opening, a maintain position in which said lock arm contacts said flexible tape and requires a first force to extract said flexible tape from said opening, and a locked position in which said lock arm is firmly in contact with said flexible tape requiring a second force greater than said first force to extract said tape from said housing.

12. The device of claim 11 wherein said grip arm and lock arm are a unitary member.

13. The device of claim 12 wherein said grip arm and said lock arm extend apart at an angle of about 90 degrees.

14. The device of claim 11 wherein said lock arm includes a tip constructed of a frictional material.

15. The device of claim 14 wherein said tip is offset from said lock arm.

16. The device of claim 15 wherein said tip has a concave shape having a smaller radius than said flexible tape.

17. The device of claim 11 wherein said slot includes a first edge and a second edge, said grip arm contacting said first edge in said open position, and contacting said second edge in said lock position.

18. The device of claim 11, further including a lock biasing member for biasing said locking lever towards said locked position.

19. The device of claim 18 wherein said lock biasing member is a torsion spring.

20. A retractable tape measure comprising:
   a) a housing having an aperture through which a coilable tape is extracted and retracted;
   b) a tape having proximal and distal ends, said proximal end being wound about a tape shaft, and said distal end positioned through said housing aperture, said tape being selectively positioned between extracted and retracted positions;
   c) a tape biasing member operatively connected with said tape shaft to bias said tape towards said retracted position;
   d) a locking lever rotatably mounted within said housing, said locking lever having a locking arm including a tip positioned off-center from said lock arm such that when said locking lever is positioned at an over centerline position, said tip locks said tape against said housing.

21. The device of claim 20 wherein said housing includes a contact surface for locking said tape in a locked orientation.

* * * * *